(12) United States Patent
Alves (10) Patent No.: US 11,046,004 B2
(45) Date of Patent: Jun. 29, 2021

(54) APPARATUS FOR TREATMENT OF RESIDUAL THERMOPLASTIC POWDER

(71) Applicant: Ford Global Technologies, LLC, Dearborn, MI (US)

(72) Inventor: Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/815,649

(22) Filed: Mar. 11, 2020

(65) Prior Publication Data
US 2020/0290278 A1 Sep. 17, 2020

(30) Foreign Application Priority Data

Mar. 11, 2019 (DE) .......................... 102019203284.2

(51) Int. Cl.
*B29B 9/10* (2006.01)
*B30B 11/16* (2006.01)
(Continued)

(52) U.S. Cl.
CPC .............. *B29C 64/314* (2017.08); *B29B 9/08* (2013.01); *B33Y 40/10* (2020.01); *B29B 9/10* (2013.01); *B29B 17/0005* (2013.01); *B29C 64/357* (2017.08); *B29K 2101/12* (2013.01); *B30B 11/12* (2013.01); *B30B 11/16* (2013.01); *B30B 11/165* (2013.01)

(58) Field of Classification Search
CPC ... B29B 9/08; B29B 17/0005; B29B 17/0026; B29B 9/10; B30B 11/12; B30B 11/16; B30B 11/165; B29C 43/08; B29C 2043/3288; B29C 2043/3678; B29C 2043/3684; B29C 2043/50; B29C 64/357

USPC ......................................... 425/217, 237, 362
See application file for complete search history.

(56) References Cited

U.S. PATENT DOCUMENTS 533,488 A * 2/1895 Nirdlinger .............. B29C 45/03
425/173
614,200 A * 11/1898 Cobb .................. B29C 45/4005
425/236
(Continued)

FOREIGN PATENT DOCUMENTS

EP 2915652 9/2015

OTHER PUBLICATIONS

Jiangsu Fuyi Machinery Technology Co., LTD, DH Series Granulator Machine product pages.
(Continued)

*Primary Examiner* — James P Mackey
(74) *Attorney, Agent, or Firm* — Burris Law, PLLC (57) ABSTRACT

An apparatus for the treatment of residual thermoplastic powder from an additive manufacturing process includes a feed apparatus for feeding powder, which includes the residual thermoplastic powder, to a pressing area, and two rotatable roller elements which are drivable in opposite directions. Lateral surfaces of the two rotatable roller elements are adjacent to one another in a pressing area and each laterally have a plurality of molding elements that are assigned to one another in pairs in order to compress powder into granules in the pressing area. Also, a cam mechanism is included and configured to deflect the molding elements of one of the two rotatable roller elements radially depending on the angle of rotation.

17 Claims, 3 Drawing Sheets

(51) Int. Cl.
*B29C 64/314* (2017.01)
*B29B 9/08* (2006.01)
*B33Y 40/10* (2020.01)
 B29K 101/12 (2006.01)
 B29C 64/357 (2017.01)
 B30B 11/12 (2006.01)
 B29B 17/00 (2006.01)

(56) References Cited

U.S. PATENT DOCUMENTS

| | | | |
|---|---|---|---|
| 1,289,570 A | 12/1918 | Stokes | |
| 1,299,570 A | 4/1919 | Groschopp | |
| 2,181,737 A * | 11/1939 | North | A21C 11/08 425/441 |
| 2,318,718 A * | 5/1943 | Scherer | A61J 3/07 53/451 |
| 2,456,697 A * | 12/1948 | Gruenwald | C03B 11/00 65/227 |
| 2,497,212 A * | 2/1950 | Donofrio | A61J 3/07 53/443 |
| 2,548,306 A * | 4/1951 | Gora | B29C 43/18 264/37.3 |
| 4,452,733 A | 6/1984 | Horiuchi et al. | |
| 4,832,880 A | 5/1989 | Staniforth | |
| 5,236,603 A | 8/1993 | Sampson | |
| 5,462,425 A * | 10/1995 | Kuss | B30B 9/20 425/183 |
| 6,402,496 B2 * | 6/2002 | Ishikawa | A61J 3/07 425/116 |
| 6,591,585 B2 * | 7/2003 | Stolz | A61J 3/07 53/454 |
| 7,228,676 B2 * | 6/2007 | Davis | A61J 3/005 53/560 |
| 8,136,444 B2 * | 3/2012 | Odagi | B30B 11/165 100/35 |
| 10,195,115 B2 * | 2/2019 | Puckett | A61J 3/07 |
| 2004/0012114 A1 | 1/2004 | Eyerer et al. | |
| 2006/0013914 A1 | 1/2006 | Shimada et al. | |
| 2008/0296800 A1 * | 12/2008 | Smith | C04B 18/021 264/228 |

OTHER PUBLICATIONS

LFA Tablet Presses, Making a Tablet Pill Mix—Making a Test Mix, pp. 1-2, Feb. 11, 2020.

* cited by examiner

APPARATUS FOR TREATMENT OF RESIDUAL THERMOPLASTIC POWDER

CROSS-REFERENCE TO RELATED APPLICATIONS

This application claims priority to and the benefit of German Patent Application No. 102019203284.2 filed on Mar. 11, 2019. The disclosure of the above application is incorporated herein by reference.

FIELD

The present disclosure relates to treatment of residual plastic powder and particularly to treatment of residual plastic powder.

BACKGROUND

The statements in this section merely provide background information related to the present disclosure and may not constitute prior art.

Various processes currently exist by means of which, on the basis of design data, three-dimensional models can be produced from shapeless or shape-neutral materials such as powders (possibly with the addition of a binder) or liquids (sometimes also including molten solids). These processes are also known under collective terms such as "rapid prototyping," "rapid manufacturing" or "rapid tooling." In this case, a primary shaping step is often carried out, in which the starting material is either present in liquid form from the outset or is liquefied in the meantime and cures at an intended location. One known process in this case is fused deposition modeling (FDM), in which a workpiece is built up in layers from thermoplastic material. The plastics material is fed for example in the form of a powder or a strand, is melted and applied in molten form by a print head, which successively applies individual, generally horizontal, layers of the object to be produced.

Also known are processes in which a pulverulent material, for example a plastics material, is applied in layers and selectively cured by means of a locally applied or printed-on binder. In yet other processes, for example selective laser sintering (SLS), a powder is applied in layers, for example using a doctor blade, to a base plate. The powder is selectively heated by means of suitable focused radiation, for example a laser beam, and as a result sintered. After a layer has been built up, the base plate is lowered slightly and a new layer is applied. In addition to plastics materials, it is also possible to use ceramics or metals as the powder. The non-sintered powder is removed after the production process. In a similar process, selective laser melting (SLM), the amount of energy introduced by the radiation is so high that the powder is regionally melted and solidifies into a coherent solid body. This process is used in particular in the case of metal powders.

In the powder-based processes, issues arise regarding further use of the residual powder that is not part of the finished object. Said powder can sometimes be reused in the additive manufacturing process, as long as its chemical and physical properties have not changed or have changed only to an insignificant extent. However, it is possible, for example in SLS, for powder particles that have been exposed to increased temperatures in the vicinity of the laser beam without actually being sintered to have altered properties that make them unfit for direct reuse. Even partial sintering of powder particles makes them unsuitable for reuse, since it is not possible to build up smooth powder layers therewith.

In principle, such residual powders could be used for example in plastics processing. However, for this purpose, it would first of all be necessary to convert them into a granular form, to which end the powder would be melted and cooled down again for example with water. This is energy- and cost-intensive, however, and the melting impairs the material properties of the plastics material. Furthermore, when cooling down with water, moisture collects or accumulates in the granules, likewise impairing the properties thereof.

U.S. Pat. No. 1,299,570 A discloses a tableting machine having a head that is rotatable about a vertical axis of rotation and has an upper punch and a lower punch cooperating therewith, which are formed in a vertically displaceable manner. In one region, rollers are arranged above and below the head, which deflect the punches toward one another during the rotation of the head. In the process, material located between the punches is pressed into a tablet form. Upon further rotation of the head, first of all the upper punch and then the lower punch is lifted, with the result that the tablet is ejected. A similar machine is known from US 2006/0013914 A1, although this machine has two pairs of rollers for two successive pressing operations. U.S. Pat. No. 4,833,880 A also discloses a comparable apparatus.

U.S. Pat. No. 5,236,603 A discloses a plant for recycling plastics containers. Therein, in different treatment steps, first of all the plastics containers are cut up to the size of flakes, lightweight materials are separated out by way of an air current, the plastics pieces are washed and dried multiple times, and residues are separated from the plastics pieces by means of two hydrocyclones. In addition to plastics milk bottles, it is also possible to recycle for example agricultural films or medical waste.

U.S. Pat. No. 4,452,733 A discloses a device for the treatment of liquid radioactive waste. Said device has a unit for drying the radioactive waste, a unit for grinding the dried radioactive waste, and a press-molding machine for molding the ground radioactive waste by means of press rollers, the lateral surfaces of which each have pockets. In order to make it easier for air to escape during press-molding, vent grooves adjacent to the pockets are formed in the lateral surface.

US 2004/0012114 A1 discloses a process for producing a granular intermediate produce from at least one substantially pulverulent or particulate thermoplastic or thermoelastic polymer and substantially inert fillers. The intermediate product is intended to be processed further into plastics moldings by way of thermoplastic processing methods. In that case, the polymer and the fillers are mixed and the powder mixture is compacted to form granules with a relatively large grain size, wherein the compacting takes place without plastification of the polymer exclusively under mechanical pressure.

EP 2,915,652 A1 discloses a method for producing a masterbatch. In that case, a powder is prepared as raw material, which exhibits residual toner. The powder is fed to a vented twin-screw extruder, melted and extruded, with the result that an extrudate is formed. The extrudate is subsequently chopped up into pellets.

In light of the above indicated references, there is still room for improvement in the utilization of residual powder that arises in additive manufacturing processes such as selective laser sintering, for example. In particular, it would be desirable to utilize the residual powder that cannot be used again in the additive manufacturing process.

SUMMARY

This section provides a general summary of the disclosure and is not a comprehensive disclosure of its full scope or all of its features.

It should be noted that the features and measures specified individually in the following description can be combined with one another in any desired technically meaningful way and disclose further forms of the present disclosure. The description additionally characterizes and specifies the present disclosure, in particular in conjunction with the figures.

An apparatus for the treatment of residual thermoplastic powder (also referred to herein simply as "residual powder") from an additive manufacturing process is provided. The additive manufacturing process, in which the residual powder arises, can be selective laser sintering (SLS). In some variations of the present disclosure, the residual powder is at least partially thermoplastic, i.e. it exhibits at least one thermoplastic material, optionally also a mix or mixture of thermoplastic materials. In particular polyamides are suitable as such materials. In addition, it is also possible for further, non-thermoplastic materials to be contained. Different grain sizes of the powder may be provided. In at least one variation, the grain size is less than 0.1 mm. If powder particles are agglomerated in the course of the additive manufacturing process, for example by partial sintering, the agglomerates in question can also have larger dimensions.

The apparatus comprises a feed apparatus for feeding powder, which includes the residual powder, to a pressing area. Such a feed apparatus can have one or more dispensing openings from which the powder emerges for example under gravity and drops or trickles into the pressing area. In this case, the feed apparatus is arranged at least partially vertically above the pressing area. In addition, other ways of introducing the powder into the pressing area, for example spraying, are included. However, gravity-supported feeding can be the simplest and most energy-efficient option. The powder includes the residual powder, i.e., it may optionally include at least one further component, which can be likewise present in powder form.

The apparatus includes two rotatable roller elements, which are drivable in opposite directions. Lateral surfaces of the two rotatable roller elements are adjacent to one another in a pressing area and each laterally have a plurality of molding elements that are assigned to one another in pairs in order to compress powder into granules in the pressing area. Each of the roller elements (which are referred to in the following text as a first and a second roller element) is rotatable about a respective axis of rotation. The axes of rotation can extend generally parallel to one another, but can also extend for example at an angle of up to 45° or up to 30° to one another. In some variations of the present disclosure the axes of rotation extend horizontally, that is to say at an angle of 90° to the acting direction of gravity. In other variations the axes of rotation do not extend horizontally. In such variations the axes of rotation can be inclined at less than 30° to the horizontal plane. The roller elements are rotatable, i.e., mounted in a rotatable manner, and drivable in opposite directions. Thus, they are drivable by at least one drive such that they rotate in opposite directions to one another. For example, in some variations of the present disclosure a drive with an equal rotational speed is provided, such that the roller elements rotate in opposite directions synchronously with one another. Also, the roller elements are configured such that their lateral surfaces move downward in the pressing area, with the result that the powder is conveyed downward between the roller elements in the pressing area such that a continuous downward movement of the powder occurs when the feed apparatus allows the powder to drop into the pressing area.

As regards the drive, there are various possibilities. For example, each roller element may be drivable by a separate motor drive. A motor drive may act on one of the roller elements, which in turn drives the other roller element, or both roller elements may be coupled to a motor drive by force-transmitting and/or transmission elements.

The lateral surfaces, that is to say the external surfaces of the two roller elements with respect to the particular axis of rotation, are arranged adjacently to one another in a pressing area. As used herein the term or phrase "pressing area" refers to an area in which the lateral surfaces of the roller elements are at the smallest distance from one another. The term "roller element" should not be interpreted as being limiting. Although a roller- or roll-like shape of the roller elements is desired, wherein the lateral surface is designed to be entirely or partially rotationally symmetric with respect to the particular axis of rotation, this does not have to be the case.

Each of the roller elements has a plurality of molding elements laterally positioned (i.e., in the region of the lateral surface). The molding elements are normally distributed around the circumference of the lateral surface, wherein they may typically be offset and in particular spaced apart from one another. The molding elements of each roller element can be formed so as to be identical to or different than one another. The molding elements of the two roller elements are assigned to one another in pairs in order to compress powder into granules in the pressing area. In other words, in each case a first molding element of the first roller element is assigned to a second molding element of the second roller element. The positions of these two molding elements and the rotary movements of the roller elements are coordinated with one another such that the molding elements are located opposite one another in the pressing area, such that a molding cavity for the granules to be produced is formed between the molding elements in the pressing area, the powder being compressed into granules in said molding cavity. As will be discussed further below, the cavity can also be partially formed by additional parts of the apparatus. The molding elements in this case at least partially define the shape of the granules to be produced. In each case two molding elements can be configured to mold exactly one grain of the granules or to mold a plurality of grains. The compressing of the powder results at least partially from the fact that the mutually assigned molding elements approach one another (i.e., move towards each other) when they move toward the pressing area, in which the roller elements are arranged adjacently to one another.

Granules are understood in this connection to be a granular material, wherein the shape of the individual grains is not defined. They can be designed for example in a spherical, cylindrical, polygonal or amorphous manner. The size of the grains of the granules is not defined in this connection either. In some variations of the present disclosure, a largest dimension of the grains is between 0.5 mm and 10 mm. Both the shape and the size of the individual grains of the granules can be uniform or nonuniform. Each of the grains of the granules includes at least partially of a thermoplastic material, optionally also of a mixture of thermoplastic materials, since it is manufactured by compressing the powder.

In at least one variation of the present disclosure, no melting or fusion of the thermoplastic powder takes place during compression. The cohesion of an individual grain of the granules can in this case be based for example on a microscopic form fit between individual powder particles or on intermolecular forces between the surfaces of adjacent powder particles. Depending on the speed and intensity of the compression, considerable heating up of the powder can result, although in some variations the melting temperature of the powder is not exceeded. In some variations, there is no active heating of the powder, that is to say no heating by heating elements provided for this purpose occurs. In order to inhibit undesirably great heating up of the powder, parts of the apparatus, in particular the molding elements, can be manufactured from a material with good thermal conductivity, for example a metal.

The (at least partially thermoplastic) granules that are producible with the apparatus can be usable in particular as raw material for primary shaping processes in plastics processing, such as injection molding, transfer molding, extrusion, blow molding or the like.

In one form of the present disclosure a cam mechanism is included and configured to deflect the molding elements of a first roller element radially depending on (as a function of) the angle of rotation of the first roller element. In other words, while the molding elements of the first roller element move during the rotation of the first roller element, they are deflected radially (with respect to the first axis of rotation) by the cam mechanism, specifically depending on the angle of rotation of the first roller element. For example, a particular radial deflection of the particular molding element corresponds to a particular angle of rotation. The term "cam mechanism" should not be interpreted as being limiting here. The cam mechanism can be designed in particular such that the described deflection results from the rotary movement of the first roller element by force diversion. That is, during the rotary movement, the molding elements are carried along, and during this guided movement, a force diversion takes place, which brings about the radial deflection. In general, the cam mechanism provides the molding elements move on a path of movement that is not concentric with respect to the first axis of rotation. Depending on the configuration of the cam mechanism, the path of movement can also be noncircular. The molding elements are in this case arranged preferably on a guide frame which is stationary in a radial direction and with respect to which they are radially deflectable. The guide frame on which the lateral surface of the first roller element can also be at least partially formed carries the molding elements along in a tangential direction, while allowing them to move in a radial direction. In particular, the molding elements can be guided on the guide frame in a radially displaceable manner. The roller elements including the molding elements and the cam mechanism form parts of a pressing apparatus.

In variations where the first axis of rotation extends horizontally or at an angle of less than 30° to the horizontal, the molding elements move downward within the pressing area and following the latter. In this case, a dispensing area can be arranged indirectly or directly beneath the pressing area with respect to the vertical. In the dispensing area, which is arranged downstream of the pressing area with respect to the rotary movement, the finished granules are dispensed, with the result that the first molding elements become free for the next pressing operation. The finished granules can drop downward under gravity and be collected there. Overall, the movement of the powder and of the finished granules within the apparatus can thus be brought about at least partially by gravity, and this can contribute to simplifying the structure and possibly toward a saving of energy.

As a result of the apparatus according to the teachings of the present disclosure, it is possible to process at least partially thermoplastic powder, which may include in particular a residual powder that arises during an additive manufacturing process, into granules which can subsequently be used for primary shaping processes such as injection molding, among others. In many cases, the powder, which arises as a residual powder for example during selective laser sintering, can be processed in the apparatus without additives. The production of the granules takes place in this case without substantial heating up and in particular without melting of the thermoplastic material. Accordingly, no cooling of a melt for example using water is necessary, with the result that undesired collection of liquid in the granules does not occur. As will become more apparent in view of the present disclosure, the apparatus can be configured in a comparatively simple and compact manner.

The compression of the powder takes place at least partially on account of the rotary movement of the two roller elements, by which the molding elements are guided toward one another. By way of the cam mechanism provided according to the teachings of the present disclosure, various steps in the manufacture of the granules can be controlled in an enhanced manner compared with molding elements that are mounted in a fixed position with respect to the roller element. There are various possibilities here, some of which will be explained in the following text.

In some variations of the present disclosure, the cam mechanism is configured to deflect the molding elements of the first roller element radially outward in the pressing area in order to support the compression of the powder. In other words, when the molding elements of the first roller element move toward the pressing area during the rotation of the first roller element, they are deflected radially outward by the cam mechanism. The deflection supports the compression of the powder, since the mutual approaching of the cooperating molding elements, which occurs anyway on account of the rotary movement of the roller elements, is enhanced when the (first) molding elements of the first roller element are deflected radially outward in the pressing area. As a result, the distance between the cooperating molding elements can be reduced, the mutual approaching thereof can be accelerated and/or a pressure acting on the powder can be increased.

In at least one variation of the present disclosure, the lateral surfaces of the two roller elements can also be spaced apart from one another in the pressing area. In this case, there is a gap between the lateral surfaces such that more powder can trickle or fall through between the roller elements. In other variations, the lateral surfaces are configured to roll in contact with one another in the pressing area. In other words, the lateral surfaces bear at least partially against one another in the pressing area and roll in contact with one another during the rotary movement of the two roller elements. The lateral surfaces do not in this case have to be formed in a smooth or rotationally symmetric manner, but can also have a meshing structure. As a result, one roller element can drive the other roller element.

According to one form of the present disclosure, the cam mechanism has a cam element that is off-center with respect to a first axis of rotation of the first roller element and is arranged within the first roller element, the molding elements being radially deflectable by said cam element. The cam element is formed or arranged in an off-center manner with respect to the first axis of rotation, i.e. in particular an outer surface, facing the molding elements, of the cam element is formed in an off-center manner. Thus, if the molding elements move in a tangential direction following the rotary movement of the first roller element, they are guided along the outer surface of the cam element, wherein, by force diversion, a radial deflection can take place, for example when the molding elements approach the pressing area.

While the cam element is off-center with respect to the first axis of rotation, it can be formed in a rotationally symmetric manner with respect to a cam axis that is offset with respect to the first axis of rotation. Therefore, it is also formed concentrically with this cam axis. For example, the cam element can be formed in a wheel-like or roller-like manner, wherein the cam axis forms the axis of symmetry thereof.

In particular, the cam element can in this case be rotatable about the cam axis synchronously with the first roller element. In other words, the cam element rotates in the same direction and at the same angular velocity within the first roller element.

In some variations of the present disclosure, the first roller element has guide channels that extend radially inward with respect to the lateral surface thereof. In such variation the molding elements can be guided within said guide channels and said guide channels can be configured to receive powder upon reaching the pressing area. The guide channels can be formed for example within the abovementioned guide frame. The guide channels can extend radially inward, wherein they can extend in particular, although not necessarily, parallel to the radial direction. The cross section of the guide channels can be adapted in particular to a cross section of the respective molding element, such that the molding element bears in a flush manner within the guide channel. In addition to guiding the respective molding elements, the guide channels also serve to receive powder when the portion of the first roller element having the particular guide channel passes into the pressing area. This design is advantageous in particular when the two lateral surfaces of the roller elements roll in contact with one another, such that there is no gap between the roller elements in the pressing area. In this case, the guide channel forms as it were a receiving area for powder.

In some variations of the present disclosure the apparatus is configured to form the granules at least partially within the guide channels. In such variations, each particular guide channel can form a part of the abovementioned molding cavity for molding the granules. For example, the cavity can be bounded radially on the inside by the molding element of the first roller element and radially on the outside by the corresponding molding element of the second roller element, while there is bounding by the guide channel transversely to the radial direction, i.e. tangentially-axially. As a result of the outward radial deflection according to the teachings of the present disclosure of the molding element, the powder that is located in the meantime entirely or partially within the guide channel is compressed.

In at least one variation, the cam mechanism is configured to deflect the molding elements radially outward after leaving the pressing area, in order to eject granules from the guide channels. "After leaving the pressing area" refers to the portion of the movement of a particular molding element in which it moves out of the pressing area. In addition, "after leaving the pressing area" can be the part of the rotary movement that (indirectly or directly) follows the passage through the pressing area. If, as described above, an outward radial deflection takes place within the pressing area, this can be continued after the pressing area has been left. During the rotary movement, the distance between the first molding elements and the second molding elements increases after the pressing area has been left, such that the granules are no longer enclosed between the first and second molding elements. To some extent, the granules can drop out of the guide channels during the further rotary movement under their own weight. Under certain circumstances, however, as a result of the pressing operation, they stick to the guide channel. The corresponding adhesion can be overcome when the molding element moves (further) radially outward, as described. As a result, the granules are pushed out of or ejected from the guide channel.

It should be understood that it can be difficult to compress all of the powder that is fed to the pressing area by the feed apparatus entirely into granules. In other words, powder arises that, in contrast to granules, cannot be used in conventional processes in plastics processing but could be used in a further pressing operation. Advantageously, the apparatus has, beneath the roller elements, a separating apparatus, which is designed to collect granules and powder and to separate them from one another. The separation can take place in different ways, wherein the separating apparatus can have in particular a screen that can optionally be coupled to a drive that sets the screen in vibration. Where it is a matter of separating granules and powder here, this separation may not be complete, wherein for example small amounts of powder can remain stuck to the granules. This is generally irrelevant for a subsequent use of the granules, however.

Furthermore, the apparatus may advantageously have a return device, which is designed to return powder separated from the granules by the separating apparatus to a storage container of the feed apparatus. The return device can have different parts or portions that are based on different conveying principles. For example, the powder can be guided on conveyor belts. In particular, the powder can be guided within corresponding lines by an air current. In other words, an air current is generated, which carries along the powder. For example, a negative pressure can be generated by the storage container of the feed apparatus, the powder being drawn in by said negative pressure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the different figures, identical parts are provided with the same reference signs, for which reason these parts are generally described only once. Also, the drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
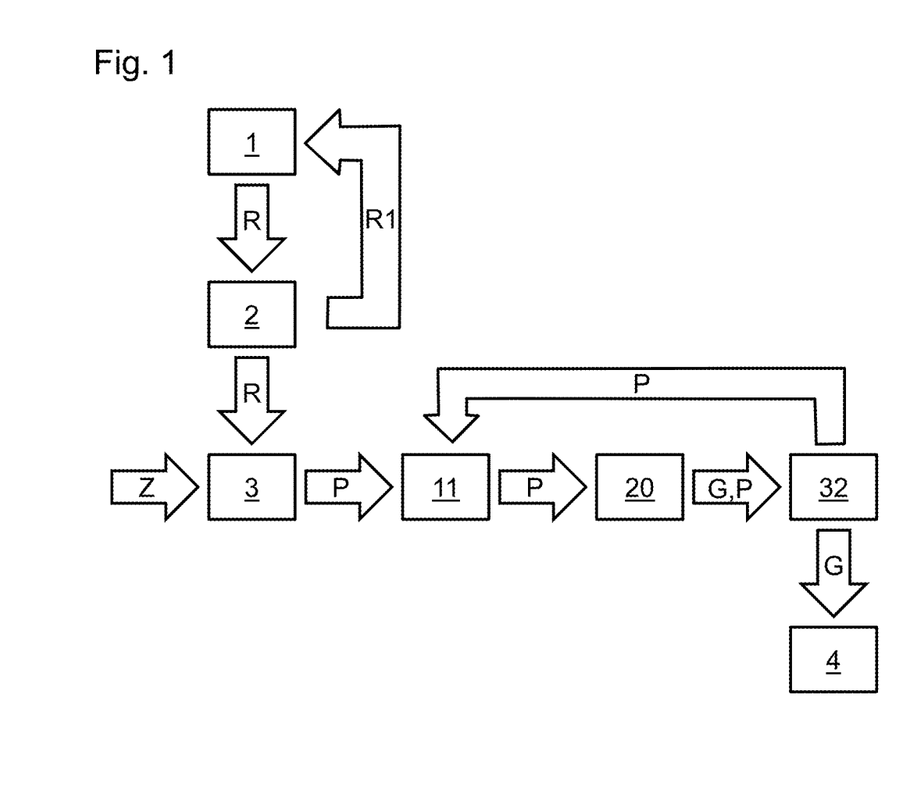
FIG. 1 shows a block diagram of a process in which the apparatus according to the teachings of the present disclosure can be used.
Figure 2:
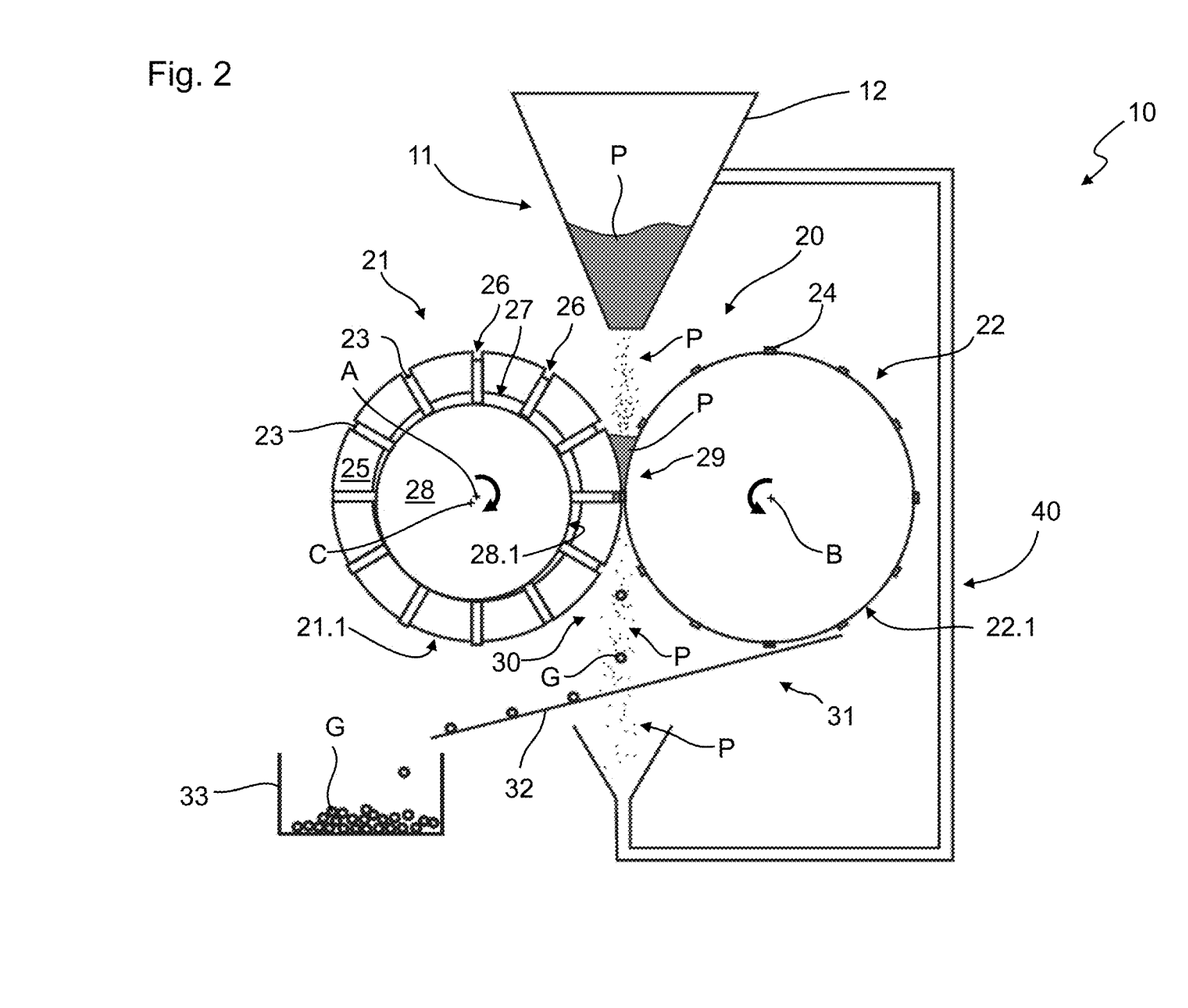
FIG. 2 shows a schematic illustration of an apparatus according to the teachings of the present disclosure.

FIG. 1 shows a block diagram of a process in which an apparatus 10 shown in FIG. 2 is used according to the teachings of the present disclosure. For example, a workpiece (not shown) is manufactured by selective laser sintering (SLS) in an SLS plant 1. To this end, a thermoplastic powder is used, which may be for example a polyamide filled with glass fibers. Residual powder R that remains after manufacture of the workpiece is fed to a first screen 2, where a share R1 of the residual powder R is separated off, returned and reused in the SLS plant 1. This first separating operation is optional.

Residual powder R that is not reused is fed, together with at least one additive Z (for example additional thermoplastic powder, a pigment, a filler or the like), to a mixer 3, where a powder P is mixed. This process step is likewise optional, and the powder P subsequently used can also consist exclusively of residual powder R. Otherwise, the powder P can have for example a weight proportion of at least 95% residual powder R, although other weight proportions are also possible. The powder P is filled into a storage container 12 of a feed apparatus 11, which is part of the apparatus 10 according to the present disclosure. The feed apparatus 11 is arranged above a pressing apparatus 20, which has a first roller element 21 and a second roller element 22. The roller elements 21, 22 are rotatable about a first and second axis of rotation A, B, respectively, which extend horizontally and parallel to one another. A drive (not shown) provides synchronous rotation in opposite directions. The feed apparatus 11 feeds the powder P to a pressing area 29 by allowing it to trickle or fall into the pressing area 29 under gravity.

Figure 3:
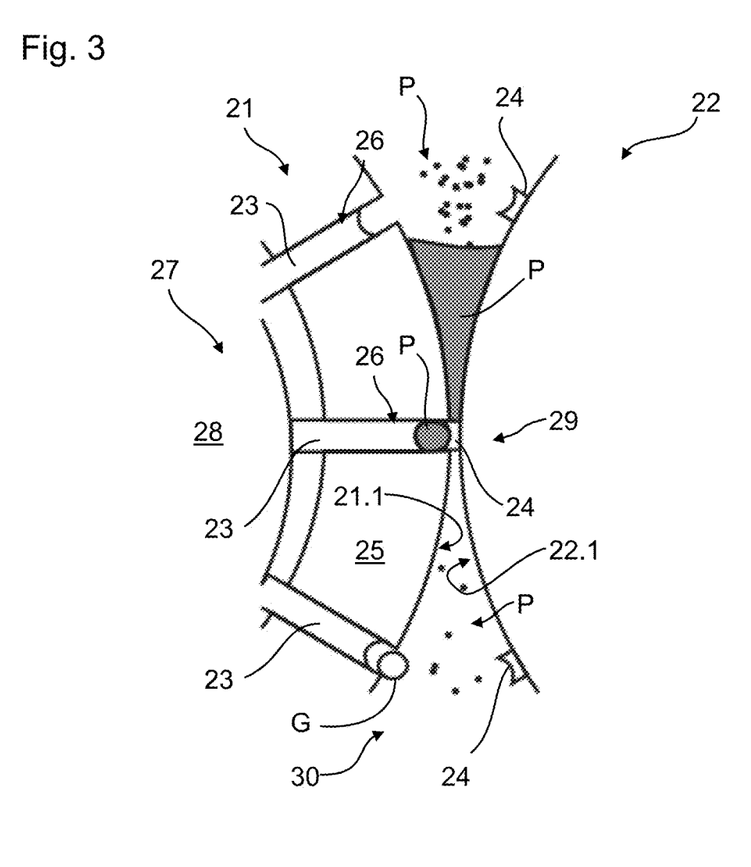
FIG. 3 shows an enlarged detail view of FIG. 2.

Lateral surfaces 21.1, 22.1 (FIG. 3) of the roller elements 21, 22, respectively, roll in contact with one another in the pressing area 29. The two roller elements 21, 22 have a plurality of molding elements 23, 24, respectively, in the region of their lateral surfaces 21.1, 22.1 (FIG. 3). First molding elements 23 of the first roller element 21 are accommodated in a guide frame 25, within which they are displaceable radially with respect to the first axis of rotation A. Each first molding element 23 is in this case arranged in a radially extending guide channel 26 within the guide frame 25, the cross section of which is coordinated or dimensioned complimentary with the cross section of the molding element 23. The guide frame 25 also forms the first lateral surface 21.1 (FIG. 3) of the first roller element 21. In at least one variation of the present disclosure, each first molding element 23 is assigned to a corresponding second molding element 24 of the second roller element 22 and cooperates therewith in the pressing area 29 in order to compress powder P into granules G. The second molding elements 24 are arranged in a fixed position on the second roller element 22 in at least one form of the present disclosure and project radially somewhat beyond the second lateral surface 22.1 (FIG. 3) of the second roller element 22.

Arranged within the first roller element 21 is a roller-like cam element 28, which is formed or positioned off-center with respect to the first axis of rotation A but in a rotationally symmetric manner with respect to a cam axis C parallel to the first axis of rotation A. The cam element 28, which belongs to a cam mechanism 27, cooperates with the first molding elements 23 and deflects the first molding elements 23 radially depending on the angle of rotation of the first roller element 21. For example, the first molding elements 21 can be preloaded radially inward for example by spring elements (not shown) such that during their movement, the first molding elements follow the external contour 28.1 (FIG. 3) of the cam element 28. Before and upon reaching the pressing area 29, each particular first molding element 23 is retracted into the guide channel 26.

As shown in FIG. 3, the guide channel 26 in the process also receives powder P. During the further rotary movement of the roller elements 21, 22, the respectively assigned second molding element 24 engages in the guide channel 26 and thus closes the guide channel 26 toward or from the outside. The powder P contained in the guide channel 26 is compressed into granules G between the first molding element 23 and the second molding element 24, wherein the pressure required for this purpose is applied both by the mutual approaching of the molding elements 23, 24 in accordance with the rotary movement of the roller elements 21, 22 and by the fact that the first molding element 23 is deflected radially outward by the cam element 28 in the pressing area 29. The compression takes place without active heating up of the powder P. If heating of the powder P occurs as a side effect of friction and compression, the heating is minor and the powder P and in particular the residual powder R contained therein does not melt.

After leaving (i.e., rotating past) the pressing area 29, the first and second molding elements 23, 24 move apart, with the result that the granules G are released. In some variations of the present disclosure, the granules G are released from the guide channel 26 and drop out under gravity during the further rotation of the first roller element 21. In at least one variation, the first molding elements 23 are deflected further radially outward by the cam element 28 after the pressing area 29 has been left, with the result that the first molding elements 23 eject the granules G in a dispensing area 30. Returning to FIG. 2, the granules G drop downward together with non-compressed powder P under gravity to a separating apparatus 31, which has a second screen 32 in the example illustrated. The grains of the granules G are retained by the screen 32 and, on account of the inclined position of the screen 32, pass into a container 33, while the particles of the powder P fall through the screen 32. The powder P can be guided back to the storage container 12 by a return apparatus 40 and are compressed subsequently into granules G. The return apparatus 40 is illustrated only schematically here and can have for example a system of pipes in which the powder P is sucked to the storage container 12 by a negative pressure.

The finished granules G can subsequently be used as raw material for various primary shaping processes in plastics processing. In the example in FIG. 1, they are used in an injection-molding apparatus 4.

LIST OF REFERENCE SIGNS

1 SLS plant
2, 32 Screen
3 Mixer
4 Injection-molding apparatus
10 Apparatus
11 Feed apparatus
12 Storage container
20 Pressing apparatus
21, 22 Roller element
21.1, 22.1 Lateral surfaces
23, 24 Molding element
25 Guide frame
26 Guide channel
27 Cam mechanism
28 Cam element
28.1 External contour 29 Pressing area
30 Dispensing area
31 Separating apparatus
33 Container
40 Return apparatus
A, B Axis of rotation
C Cam axis
G Granules
P Powder
R Residual powder
R1 Share
Z Additive Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spacially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for treatment of a residual thermoplastic powder from an additive manufacturing process, the apparatus comprising:
a feed apparatus for feeding powder to a pressing area, wherein the powder includes the residual thermoplastic powder;
a first rotatable roller element and a second rotatable roller element spaced apart from the first rotatable roller element, wherein the first and second rotatable roller elements are drivable in opposite directions and each of the first and second rotatable roller elements have a lateral surface, the lateral surfaces are adjacent to and have a gap between one another in the pressing area, the first rotatable roller element having a plurality of first molding elements assigned to the lateral surface of the first rotatable roller element and the second rotatable roller element having a plurality of second molding elements arranged in a fixed position and assigned to and projecting radially outward from the lateral surface of the second rotatable roller element, wherein the plurality of first molding elements and the plurality of second molding elements are assigned to one another in pairs such that the powder is compressed into granules by the plurality of first and second molding elements in the pressing area, and powder in the pressing area not compressed into granules falls through the gap between the first rotatable roller element and the second rotatable roller element; and
a cam mechanism configured to deflect the plurality of first molding elements of the first rotatable roller element radially as a function of an angle of rotation of the first rotatable roller element.

2. The apparatus according to claim 1, wherein the cam mechanism is configured to deflect the plurality of first molding elements of the first rotatable roller element radially outward in the pressing area in order to compress the powder.

3. The apparatus according to claim 1, wherein the cam mechanism has a cam element that is off-center with respect to a first axis of rotation of the first rotatable roller element and is arranged within the first rotatable roller element and the plurality of first molding elements of the first rotatable roller element are radially deflectable by the cam element.

4. The apparatus according to claim 3, wherein the cam element is rotationally symmetric with respect to a cam axis that is offset with respect to the first axis of rotation of the first element.

5. The apparatus according to claim 3, wherein the first rotatable roller element has guide channels that extend radially inward from the lateral surface of the first rotatable roller element such that the plurality of first molding elements of the first rotatable roller element are guided within the guide channels and the guide channels receive the powder upon reaching the pressing area.

6. The apparatus according to claim 5, wherein the guide channels are configured for granules to be formed therewithin.

7. The apparatus according to claim 5, wherein the cam mechanism is configured to deflect the plurality of first molding elements of the first rotatable roller element radially outward after leaving the pressing area such that the granules are ejected from the guide channels.

8. The apparatus according to claim 1 further comprising a separating apparatus positioned beneath the first and second rotatable roller elements, wherein the separating apparatus is configured to collect and separate granules and the powder after leaving the pressing area.

9. The apparatus according to claim 8 further comprising a return device configured to return the powder separated from the granules by the separating apparatus to a storage container of the feed apparatus.

10. An apparatus for treatment of a residual thermoplastic powder from an additive manufacturing process, the apparatus comprising:
- a feed apparatus for feeding a powder, wherein the powder includes the residual thermoplastic powder;
- a first roller element and a second roller element spaced apart from the first roller element, wherein the first and second roller elements are rotatably drivable in opposite rotational directions, each of the first and second roller elements have a lateral surface adjacent to and spaced apart from one another in a pressing area, the first roller element has a plurality of first molding elements assigned to the lateral surface of the first roller element and the second roller element has a plurality of second molding elements arranged in a fixed position and assigned to and projecting radially outward from the lateral surface of the second roller element, wherein the plurality of first molding elements and the plurality of second molding elements are assigned to one another in pairs such that the powder fed into the pressing area by the feed apparatus is compressed into granules by the plurality of first and second molding elements in the pressing area, and powder in the pressing area not compressed into the granules falls through a gap between the first roller element and the second roller element; and
- a cam mechanism configured to deflect the plurality of first molding elements of the first roller element radially outward as a function of an angle of rotation of the first roller element.

11. The apparatus according to claim 10, wherein the cam mechanism has a cam element arranged within the first roller element, the cam element is arranged off-center with respect to a first axis of rotation of the first roller element, and the plurality of first molding elements of the first roller element are radially deflectable by the cam element.

12. The apparatus according to claim 11, wherein the cam element is rotationally symmetric with respect to a cam axis that is offset with respect to the first axis of rotation of the first roller element.

13. The apparatus according to claim 12, wherein the first roller element has guide channels that extend radially inward from the lateral surface of the first roller element such that the plurality of molding elements of the first roller element are guided within the guide channels and the guide channels receive the powder upon reaching the pressing area.

14. The apparatus according to claim 13, wherein the cam mechanism is configured to deflect the plurality of first molding elements of the first roller element radially outward after leaving the pressing area such that the granules are ejected from the guide channels.

15. An apparatus for treatment of a residual thermoplastic powder from an additive manufacturing process, the apparatus comprising:
- a feed apparatus for feeding a powder, wherein the powder includes the residual thermoplastic powder from the additive manufacturing process;
- a first roller element and a second roller element spaced apart from the first roller element, wherein the first and second roller elements are drivable in opposite rotational directions, each of the first and second roller elements have a lateral surface adjacent to and spaced apart from one another in a pressing area, the first roller element has guide channels extending inwardly from the lateral surface of the first roller element and a plurality of first molding elements guided within the guide channels and assigned to the lateral surface of the first roller element, and the second roller element has a plurality of second molding elements arranged in a fixed position and assigned to and projecting radially outward from the lateral surface of the second roller element, wherein the plurality of first molding elements and the plurality of second molding elements are assigned to one another in pairs such that the powder fed into the pressing area by the feed apparatus is compressed into granules by the plurality of first and second molding elements in the pressing area, and powder in the pressing area not compressed into the granules falls through a gap between the first roller element and the second roller element; and
- a cam mechanism configured to deflect the plurality of first molding elements of the first roller element radially outward as a function of an angle of rotation of the first roller element.

16. The apparatus according to claim 15, wherein the cam mechanism has a cam element arranged within the first roller element, the cam element is rotationally symmetric with respect to a cam axis that is offset with respect to a first axis of rotation of the first roller element, and the plurality of first molding elements of the first roller element are radially deflectable by the cam element.

17. The apparatus according to claim 15, wherein the cam mechanism is configured to deflect the plurality of first molding elements of the first roller element radially outward after leaving the pressing area such that granules are ejected from the guide channels.

* * * * *